United States Patent [19]
Wada et al.

[11] Patent Number: 5,121,147
[45] Date of Patent: Jun. 9, 1992

[54] VIDEO CAMERA CARRYING HANDLE SUPPORTING BATTERY AND ACCESSORIES

[75] Inventors: Koichi Wada; Naoki Kamaya, both of Tokyo, Japan

[73] Assignee: Sony Corporation, Tokyo, Japan

[21] Appl. No.: 676,744

[22] Filed: Mar. 28, 1991

[30] Foreign Application Priority Data

Mar. 29, 1990 [JP] Japan ................................ 2-82242

[51] Int. Cl.⁵ .............................................. G11B 31/00
[52] U.S. Cl. ........................................ 354/81; 354/82; 354/293; 354/484; 354/295; 358/906
[58] Field of Search .................... 354/81, 82, 288, 484, 354/293, 295; 358/906, 909

[56] References Cited

U.S. PATENT DOCUMENTS

| | | |
|---|---|---|
| 4,221,477 | 9/1980 | Prochnow et al. . |
| 4,255,036 | 3/1981 | Pincetich . |
| 4,772,902 | 9/1988 | Inoue et al. ............................ 354/82 |
| 4,866,465 | 9/1989 | Gallegus .............................. 354/295 |
| 4,924,246 | 5/1990 | Yamada .............................. 358/906 |
| 4,984,090 | 1/1991 | Sasaki et al. ........................ 354/293 |
| 5,068,683 | 11/1991 | Miyazaki ............................ 354/484 |

FOREIGN PATENT DOCUMENTS

0248676A2 12/1987 European Pat. Off. .
2129950A  5/1984 United Kingdom .

*Primary Examiner*—W. B. Perkey
*Assistant Examiner*—Cassandra C. Spyrou
*Attorney, Agent, or Firm*—Philip M. Shaw, Jr.

[57] ABSTRACT

In order to provide a compact carrying handle arrangement for a video camera which is not provided with carrying handle connections per se, the lower horizontally extending portion of an essentially C-shaped handle extends along the lower edge of the camera and is secured thereto by a screw which is threaded into the threaded bore provided for connecting the tripod. The vertical portion of the handle has a connection site which can operatively engage with a first battery mounting site provided on the rear of the camera. A second battery site is provided on the handle and is arranged to receive the battery. The second mounting site is electrically connected with the connection site so that power from the battery can be supplied to the camera via the first battery mounting site. The grip portion of the handle extends forward in a space relationship over the top of the camera. Hot shoes are formed at the leading end of the grip portion and operatively connected with the second battery mounting site so as to enable power to be supplied thereto from the battery.

8 Claims, 6 Drawing Sheets

VIDEO CAMERA CARRYING HANDLE SUPPORTING BATTERY AND ACCESSORIES

BACKGROUND OF THE INVENTION

1. Field of the Invention

The present invention relates generally to a hand held VTR type video camera of the type wherein an optical image is converted into electrical signals and recorded on a magnetic tape in a tape cassette, and more specifically to a multi-purpose carrying handle which can be connected thereto.

2. Description of the Prior Art

Hand held cameras of the type wherein images which have passed through an optical lens system are converted into electrical video signals by way of a CCD and recorded on the magnetic tape in a cassette which is operatively disposed within the camera body, are now in common use.

However, when such devices are not in use and are being transported from one place to another, a carrying handle is frequently required. However, with current ultra-small compact hand-held 8 milli type video cameras, in order to achieve the light weight and compactness which is inherently required, the camera construction and design becomes such that it is very difficult to provide connection sites of adequate size and robustness to permit a carrying handle to be conveniently connected thereto.

SUMMARY OF THE INVENTION

It is an object of the present invention to provide a carrying handle for a video camera which is compact and which does not require the camera to be provided with carrying handle connections per se.

It is a further object of the present invention to provide a carrying handle which can be operatively connected between a battery mounting site on the camera and the battery which is normally directly connected to the camera by way of the mounting site.

It is yet another object of the present invention to provide a carrying handle for a video camera which is equipped with one or more hot shoes and which carrying handle can provide an electrical connection between the battery, the camera and the hot shoe(s).

In brief, the above objects are achieved by an arrangement wherein the lower horizontally extending portion of an essentially C-shaped handle extends along the lower edge of the camera and is secured thereto by a screw which is threaded into the threaded bore provided for connecting the tripod. The vertical portion of the handle has a connection site which can operatively engage with a first battery mounting site provided on the rear of the camera. A second battery site is provided on the handle and is arranged to receive the battery. The second mounting site is electrically connected with the connection side so that power from the battery can be supplied to the camera via the first battery mounting site. The grip portion of the handle extends forward in a space relationship over the top of the camera. Hot shoes are formed at the leading end of the grip portion and operatively connected with the second battery mounting site so as to enable power to be supplied thereto from the battery.

More specifically, as first aspect of the present invention comes in a carrying handle for a video camera, which carrying handle features: means defining a connection site on the handle which can be selectively connected to a battery connection site on a camera body; and means included in the handle by way of which electrical power can be supplied to the camera.

A second aspect of the present invention comes in a video camera carrying handle for a camera which has a battery mounting site on a rear section thereof and a threaded bore via which a tripod can be connected to a lower section thereof, the carrying handle featuring: means for supplying electrical power through the handle to the camera; a portion having a battery mounting site; and a portion which is adapted to be connected to the camera by way of the threaded bore.

A third aspect of the present invention comes in a video camera carrying handle for a camera video camera the body of which has a battery mounting site at the rear and a threaded tripod connection bore on the lower side thereof, the carrying handle featuring: means for supplying electrical power through the handle to the camera; a portion having battery mounting site on which a battery can be operatively mounted; a portion which be releasably connected to the camera through the threaded tripod connection bore; and a grip portion on which an accessory hot shoe is provided.

A fourth aspect of the present invention comes in a video camera accessory device for use with a video camera having a battery mounting site on which a battery can be mounted, the battery mounting site being located at the rear of the camera, the camera accessory being so constructed and arranged that it is interposable between the camera mounting site and the battery, so that electrical power from the battery can be supplied to the camera, and so that a light can be attached thereto in a manner wherein electrical power can be supplied to the light from the battery.

BRIEF DESCRIPTION OF THE DRAWINGS

The objects and features of the present invention will become clear as a description of several embodiments is made in conjunction with the appended drawings in which.

DETAILED DESCRIPTION OF THE PREFERRED EMBODIMENTS

Figure 1:
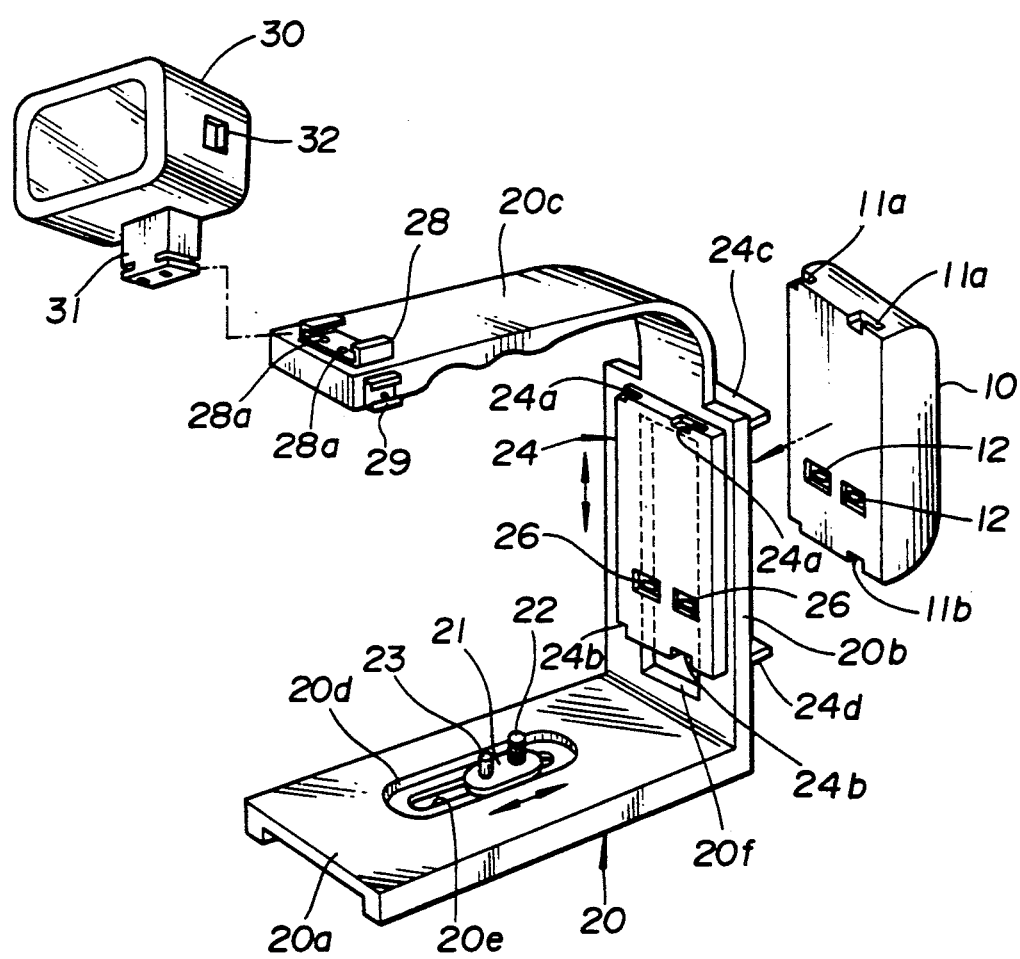
FIG. 1 is a perspective view showing a carrying handle according to the present invention and which illustrates the manner which a battery pack and lamp accessory can be connected thereto.
Figure 2:
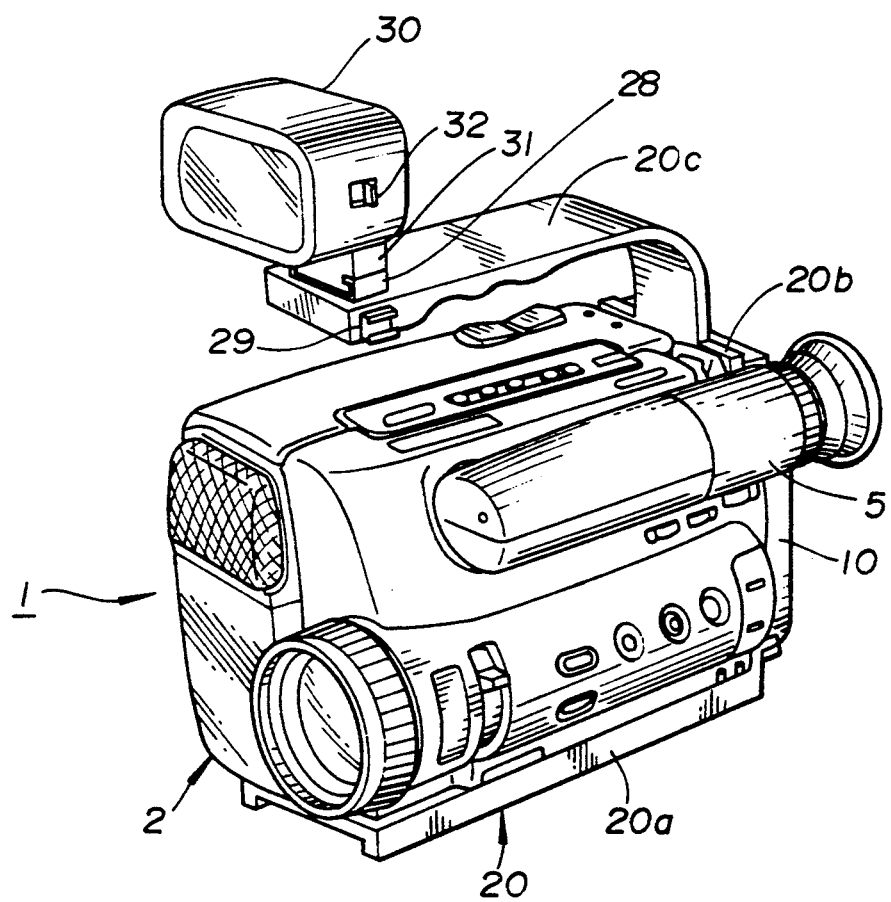
FIG. 2 is a perspective view showing the video camera to which the inventive carrying handle has been connected and used to support a lamp.
Figure 3:
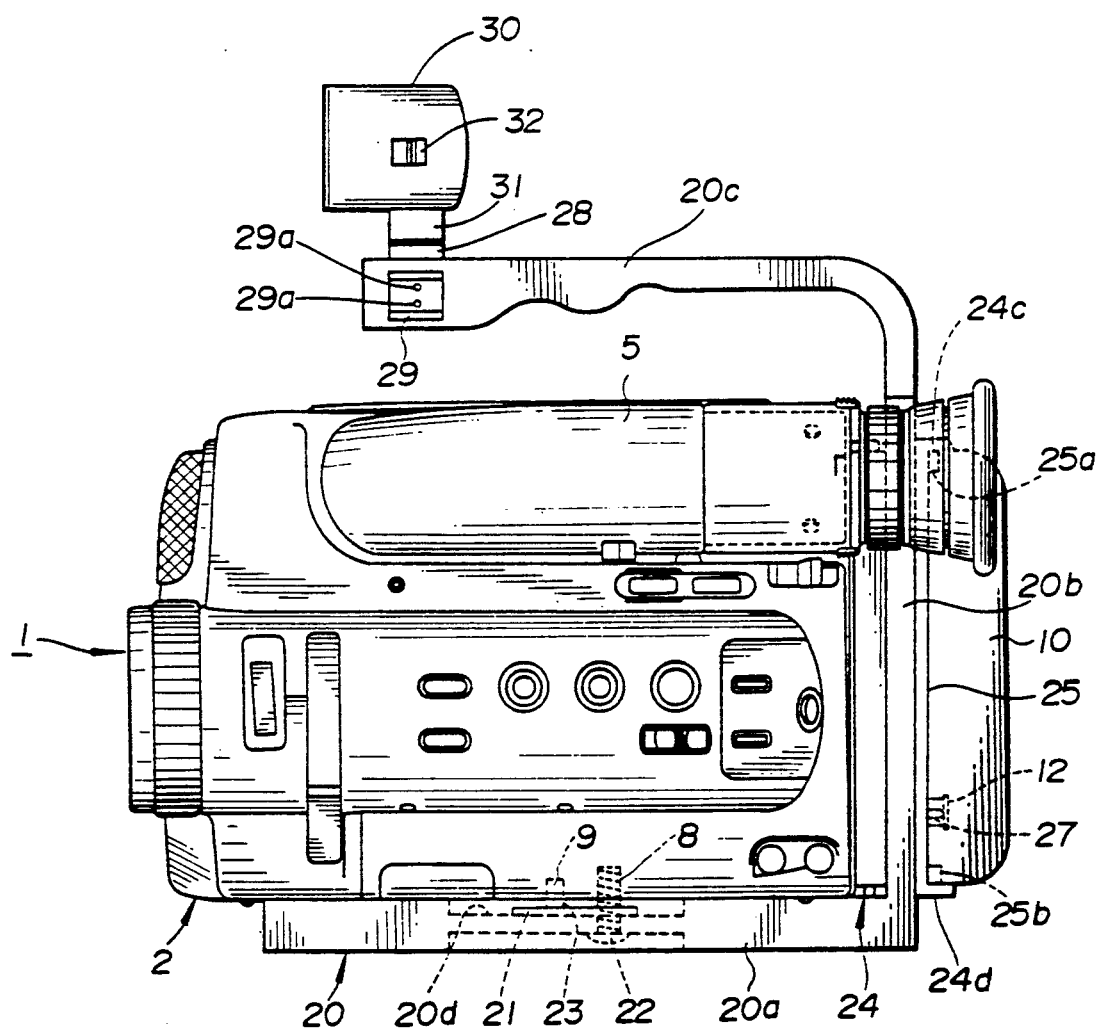
FIG. 3 is a side elevation of the arrangement shown in FIG. 2 highlighting the manner in which the handle is connected to the camera body via the tripod mounting site provided on the lower surface thereof.

FIGS. 1 to 3 show an embodiment of the present invention. In this arrangement the video camera 1 to which the present invention is applicable takes the form of a so called "8-milli" type and includes a cabinet 10 which has a grip 3 provided on the lower right hand side thereof in the manner shown in FIGS. 4 and 5. This grip 4 is located below a VTR deck section 4 into which a non-illustrated tape cassette can be loaded.

A view finder 5 is arranged on the left hand side of the camera body 2 while a battery mounting site 6 is formed on the rear edge of the casing. As best appreciated from FIG. 4 this mounting site includes essentially L shaped projections 6a, 6a and 6b, 6b which are formed integrally on the inboard faces of mounting flanges 2a and 2b which extend from the upper and lower edges of the mounting site. These projections are arranged to interlockingly cooperate with the recesses 11a, 11a and 11b, 11b formed in the upper and lower corners of a battery pack 10. The battery mounting site further includes positive and negative electrodes 7, 7 which are engageable with spring plate type contacts 12, 12 provided on the inner face of the battery pack 10 (see FIG. 1), and through which electrical current can be supplied to the circuitry/motors included in the camera body 2.

It should be noted that while the battery pack 10 is illustrated as being of the pack type, the present invention is not limited to this type of power source and a case type arrangement into which cell type batteries can be loaded, can be used as desired.

The carrying handle 20 which characterizes the present invention is shown in FIGS. 1–3. In this instance the handle is essentially C-shaped and comprises a horizontal base portion 20a, a vertically extending portion 20b and a grip portion 20c. The base portion 20a is formed with a centrally located recess 20d in which an elongate slot 20e is defined. A slide plate 21 is disposed in the recess 20d and arranged to be reciprocally movable back and forth therealong. A screw 22 of the type provided on a camera mounting tripod is disposed through the slide plate 21 and arranged to be threadedly received in a threaded tripod connection bore 8. The slide plate is further formed with a pin 23 which extends up from the upper surface of the plate and which is receivable in a positioning bore 9 formed in the bottom of the camera body 2 proximate the threaded bore 8.

The vertically extending portion 20b is formed with an elongate opening 20f in which a battery connection plate 24 is reciprocally received. As indicated in FIG. 1 this connection plate 24 is arranged so that it can be moved up and down along the slot 20f. The front or inner face of the connection plate 24 is formed with L-shaped recesses 24a, 24a and 24b, 24b which are adapted to engagingly receive the projections 6a, 6a and 6b, 6b formed on the mounting flanges 2a, 2b. The front face is further formed with spring plate type contacts 26, 26 which are engageable with the pin type contacts 7, 7 which extend from the battery mounting site 6 formed on the rear of the camera 1.

The rear or outer face of the connection plate 24 is formed with a battery mounting site 25 which is constructed and arranged in exactly the same manner as the battery mounting site 6 formed on the camera body 2. That is to say, the mounting plate 24 includes mounting flanges 24c, 24d which are provided with L shaped projections 25a, 25a and 25b, 25b, and pin type contacts 27, 27.

Figure 6:
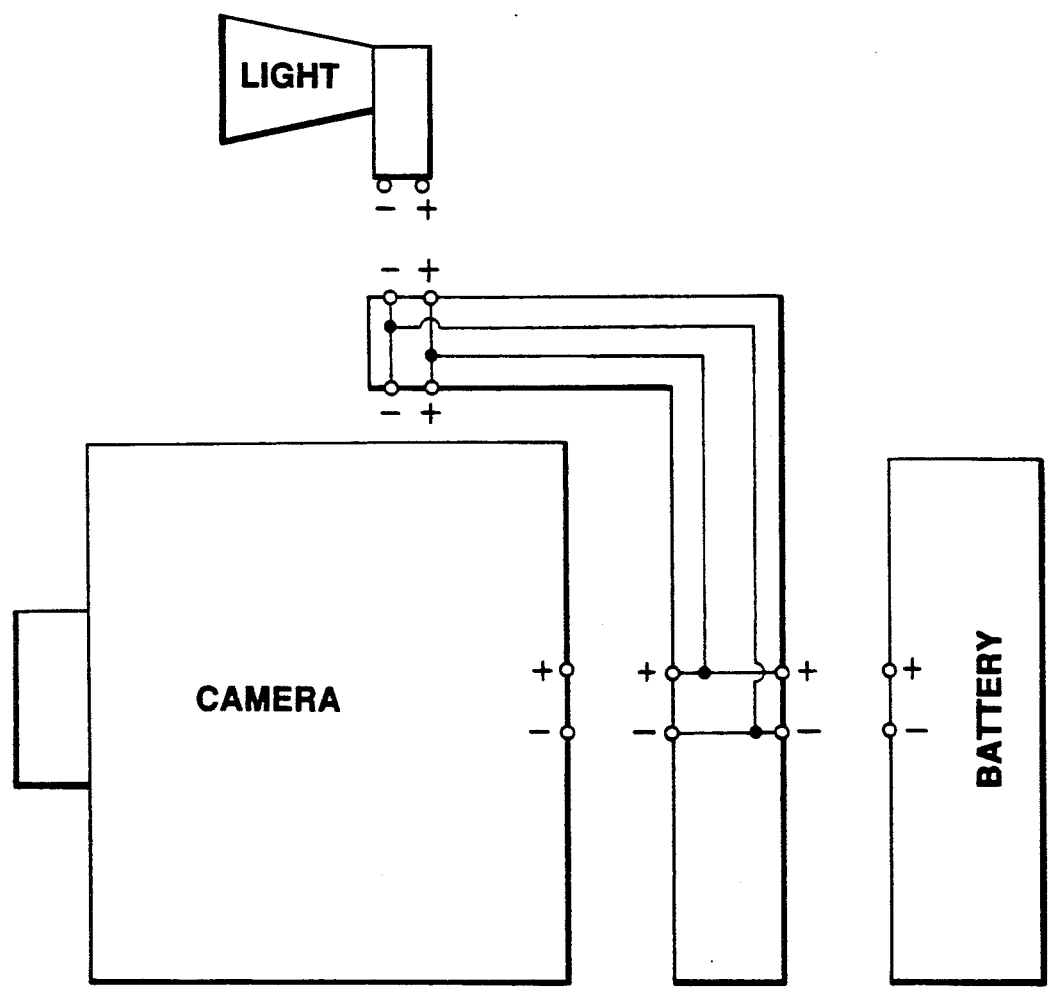
FIG. 6 is a schematic diagram showing the manner in which the carrying handle according to the present invention establishes electrical connection between the battery, the camera and the hot shoes to which a light and like type of accessory can be connected.

When the battery pack 10 is mounted on the mounting site 25, the projections 25a, 25a and 25b, 25i b engage in the recesses 11a, 11a and 11b, 11b in the same manner as when the battery pack 10 is mounted on the camera body 2. In order for electrical connection between the battery and the camera to be established, the pin type contacts 27, 27 formed on the mounting site 25 and which engage with the spring plate type contacts 12, 12 of the battery, are electrically connected with the spring plate type contacts 26, 26 formed on the connection plate 24. The pin type contacts 27, 27 are also electrically connected via non-illustrated lead lines, with contacts 28a, 28a and 29a, 29a of accessory mounting hot shoes 28, 29 provided at the leading end of the grip portion 20c. With this arrangement electrical power from the battery pack 10 can be supplied to both the camera and the accessory hot shoes 28, 29 (see FIG. 6).

In this embodiment the accessory hot shoe 28 is illustrated as being used to mount a video light 30. The accessory hot shoe 29 can be used to mount a microphone or the like. A switch 32 provided on the lamp body enables the light to be switched on and off as desired.

Figure 4:
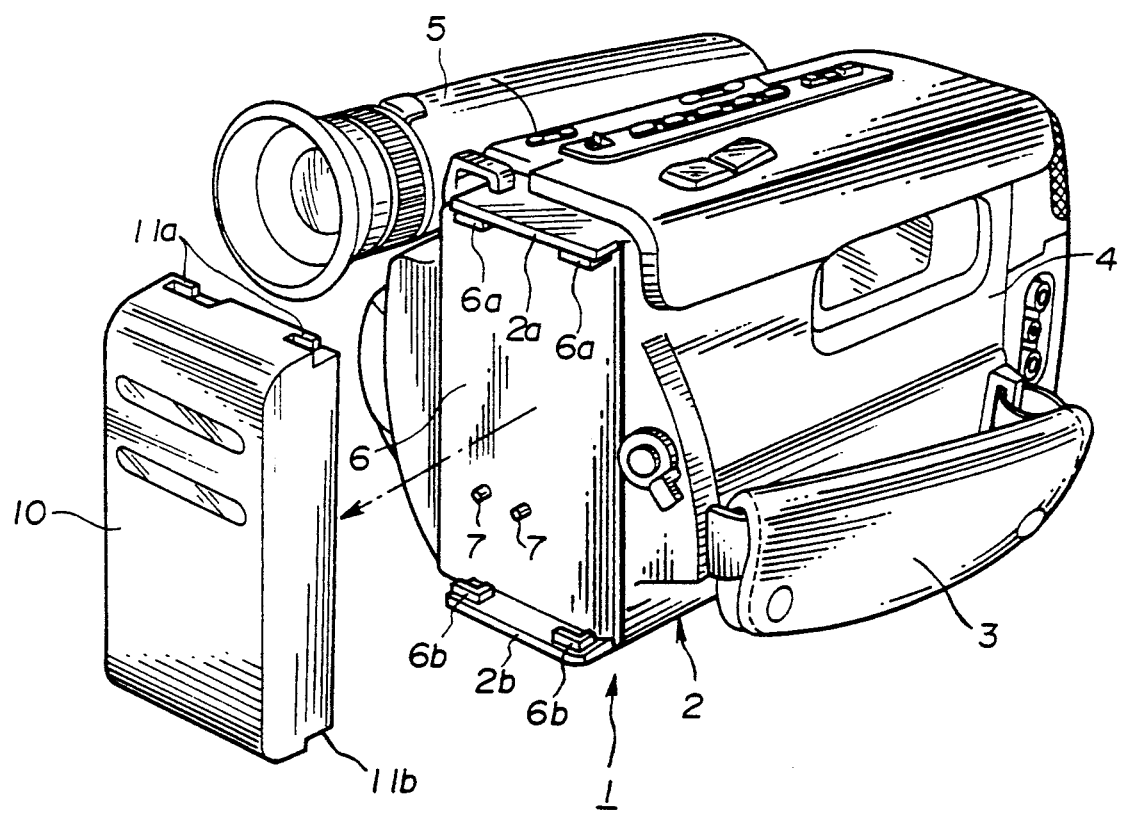
FIG. 4 is a perspective view showing a video camera and battery pack arrangement of the type to which the inventive handle is applicable.
Figure 5:
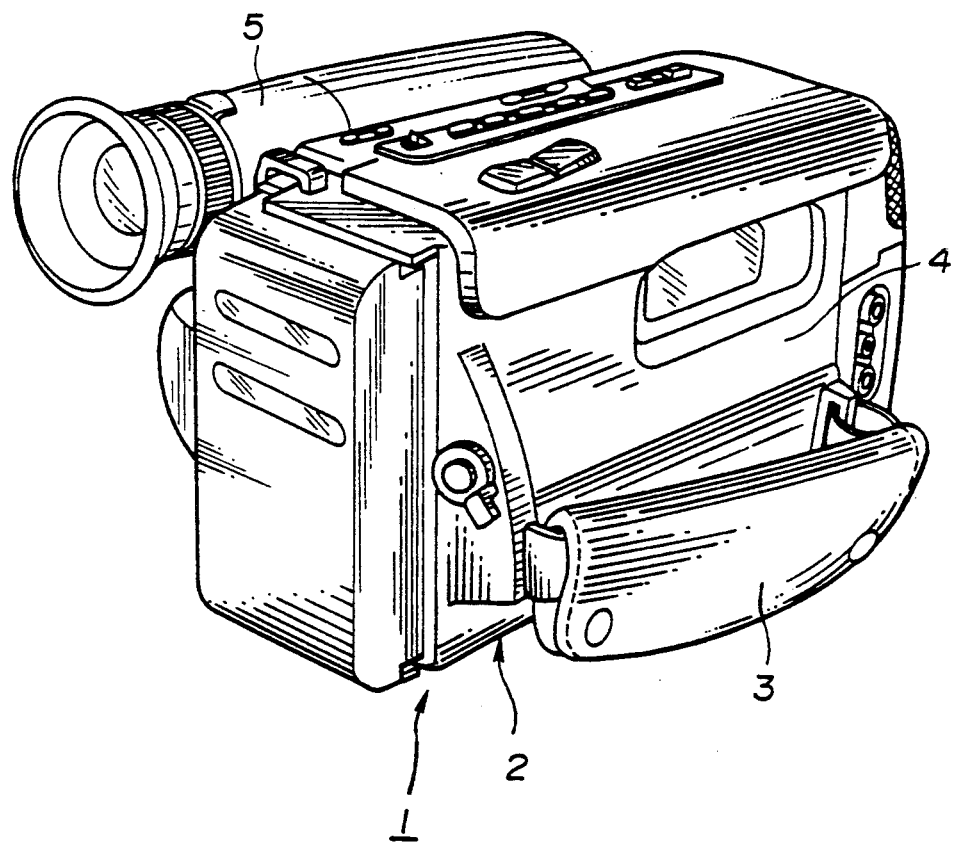
FIG. 5 a perspective view showing the camera and battery pack of FIG. 4 in a fully assembled condition.

With the above described embodiment, when it is desired to use the carrying handle, first the battery pack 10 is detected from the mounting site 6 formed in the camera body 2 in the manner indicated in FIG. 4. Following this, the carrying handle 20 is placed in position on the camera with the connection plate 24 in a raised position and so that the projections 6a, 6a and 6b, 6b are engaged in the recesses 24a, 24a and 24b, 24b and so that a suitable clearance is provided between the bottom of the camera 1 and the horizontally extending base portion 20a.

Next, the slide plate 21 is moved to a position wherein the guide pin 23 is aligned with the guide bore 9. The handle 20 is then moved upwardly with respect to the camera body 2 so that the horizontally extending base portion approaches the bottom edge of the camera and the pin 23 enters the bore 9. After this the screw 22 is threaded into the bore 8 in a manner which secures the handle 20 and the camera body 2 together. The battery 10 is subsequently mounted on the mounting site 25 in a manner wherein the projections 25a, 25a and 25b, 25b are engaged in the recesses 11a, 11a and 11b, 11b formed at the corners of the battery unit 10.

Under these conditions the pin type contacts 27, 27 are in electrical contact with the spring plate type contacts 12, 12 of the battery, and the pin type contacts 7, 7 on the mounting site 6 are in electrical contact with the spring plate type contacts 26, 25 on the mounting plate 24. Accordingly, electrical connection between the battery pack 10 and the camera 1 and between the battery pack 10 and the accessory shoes 28 and 29, are respectively established.

Thus, as will be appreciated, with the present invention it is possible to connect a carrying handle to video cameras of the type wherein a battery pack mounting site is provided at the rear of the camera body 2 without the need for the special provision of carrying handle connections per se.

Further, as the carrying handle is provided with a battery mounting site 25 and is arranged so that horizontally extending base portion is adapted so that is can make use of the tripod connection arrangement, it can be connected easily and subsequently used to carry the battery pack 10. In addition, the design is such that the grip portion 20c of the handle extends above the camera, does not get in the way during use and additionally serves the mount accessories such as lights, microphones, etc.

Further, the carrying handle according to the present invention can be connected in a manner wherein it compactly fits about the camera in a manner which appears to be integral therewith, which does not require special connections to be provided and which does not detract from the design/appearance of the camera.

While the above embodiment has been disclosed in a manner wherein the battery pack 10 is connectable to the battery mounting site 25, it is within the scope of the present invention to form the battery pack/case in a manner so that it is integral with the carrying handle.

What is claimed is:

1. A carrying handle for a video camera, the camera having a battery mounting site on a rear section thereof and a threaded bore on a lower section of the camera for attaching a tripod, the carrying handle comprising:
    means for supplying electrical power through the handle to the camera;
    a first portion having the battery mounting site; and
    a second portion which is adapted to be connected to the camera by way of the threaded bore.

2. A carrying handle for a video camera, the camera having a battery mounting site at a rear side thereof and a threaded tripod connection bore on a lower side of the camera, the carrying handle comprising:
    means for supplying electrical power through the handle to the camera;
    a first portion having the battery mounting site on which a battery can be operatively mounted;
    a second portion which can be releasably connected to the camera through the threaded tripod connection bore; and
    a grip portion on which an accessory hot shoe is provided to mount an accessory to the handle and to supply electrical power through the handle to the accessory.

3. A video camera carrying handle for use with a video camera having a battery mounting site on which a battery can be mounted, the battery mounting site being located at a rear of the camera, the camera carrying handle being so constructed and arranged that it is interposable between the camera mounting site and the battery, so that electrical power from the battery can be supplied to the camera, and so that a light can be attached to the carrying handle in a manner wherein electrical power can be supplied to the light from the battery through the handle.

4. A video camera carrying handle as claimed in claim 3 wherein said carrying handle is so constructed and arranged that the light can be supported at a position which is one of above and beside the camera.

5. A video camera carrying handle as claimed in claim 3 where said carrying handle has a portion which is connectable to the camera and which further comprises a second battery mounting site.

6. A video camera carrying handle as claimed in claim 5 wherein the battery mounting site on the camera and the battery mounting side on the carrying handle comprise L shaped projections.

7. A video camera carrying handle as claimed in claim 6 wherein the battery mounting site on the camera and the battery mounting site on the carrying handle have rectangular configurations, the rectangular configurations each having four corners, and wherein the L-shaped projections are formed at each of the four corners.

8. A generally C-shaped carrying handle for a video camera, the video camera having a battery mounting site on a rear section thereof which includes four L-shaped projections, the camera also having a threaded, tripod connection bore on a lower section thereof, the carrying handle comprising:
    a first attachment portion located on a lower region of the handle which can be releasably connected to the camera through the threaded, tripod connection bore;
    a vertically slidable second attachment portion located on a vertical region of the handle which can be releasably connected to the battery mounting site on the camera and can provide electrical power to the camera therethrough, the second attachment portion having a rectangular configuration with four corners, each of the corners having an L-shaped recess for releasably engaging the L-shaped projections on the battery mounting site of the camera;
    the battery mounting site rigidly connected to the vertically slidable second attachment portion and electrically coupled thereto, the battery mounting site having a rectangular configuration with four corners, each of the corners having an L-shaped projection for releasably engaging a battery having L-shaped recesses, the mounting site having connectors to releasably electrically connect the battery to the second attachment portion, thereby providing power to the camera;
    a grip portion located on an upper region of the handle for carrying the camera; and
    an accessory mounting hot shoe located on an upper portion of the handle forward of the grip, being electrically connected through the handle to the battery mounting site, for attaching and electrically powering the accessory.

* * * * *

UNITED STATES PATENT AND TRADEMARK OFFICE
CERTIFICATE OF CORRECTION

PATENT NO. : 5,121,147
DATED : June 9, 1992
INVENTOR(S): Wada et al.

It is certified that error appears in the above - identified patent and that said Letters Patent is hereby corrected as shown below:

IN THE CLAIMS:
   In column 5, lines 19 and 28, replace both occurrences of "the battery" with --a second battery--.
   In column 6, line 36, replace "the battery" with --a second battery--; line 38, replace "the battery" with --the second battery--; line 42, replace "the mounting" with --the second battery mounting--; and lines 50 and 51, replace "the battery" with --the second battery--.

Signed and Sealed this

Third Day of August, 1993

Attest:

MICHAEL K. KIRK

Attesting Officer

Acting Commissioner of Patents and Trademarks